F. REESE.
Plows.

No. 133,722. Patented Dec. 10, 1872.

Witnesses: Inventor:

UNITED STATES PATENT OFFICE.

FRANCIS REESE, OF WILSONVILLE, ALABAMA, ASSIGNOR OF ONE-HALF HIS RIGHT TO SAMUEL F. COLEMAN, OF SAME PLACE.

IMPROVEMENT IN PLOWS.

Specification forming part of Letters Patent No. 133,722, dated December 10, 1872; antedated December 7, 1872.

*To all whom it may concern:*

Be it known that I, FRANCIS REESE, of Wilsonville, county of Shelby, State of Alabama, have invented a new and Improved Subsoil and Turning Plow; and I declare the following to be a full, clear, and exact description of same, such as will enable others skilled in the art to which it pertains to make and use it, reference being had to the accompanying drawing, which forms a part of this specification.

My invention relates to plows on which the shovel is made reversible, and having attached to the plow-frame another subsoil-plow, made gageable by means of gageable bars.

Figure 1:
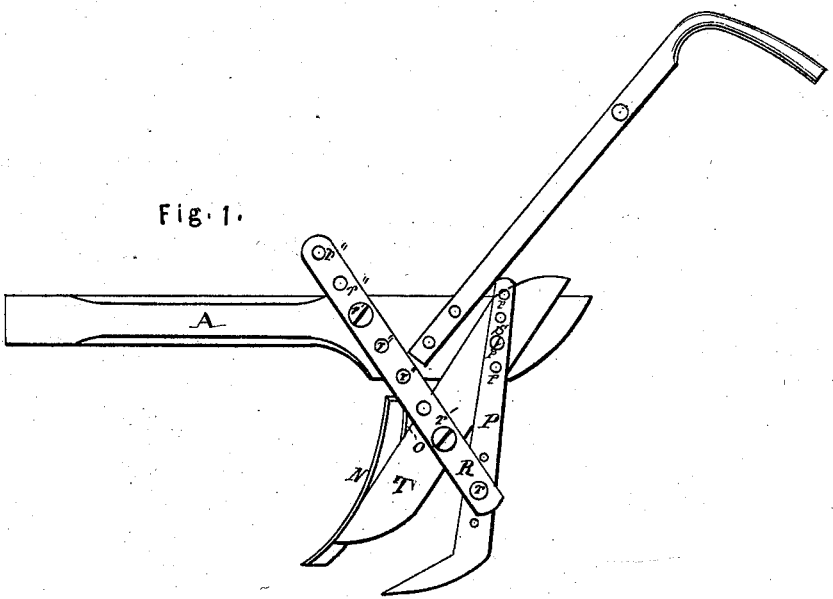

In the drawing, Figure 1 is a view of the plow in elevation, in which—

A is the plow-beam, with shovel-brace T. N is the reversible shovel. O is the edge of the mold-board. P is the subsoil-plow brace, gageable by screw S through one of the holes $p$ in the bar P. R is gageable bar, and is attached to the arm P by bolt $r$, and to the arms T and A by screws or bolts $r'$ $r'$, passing through gage-holes $r''$ $r''$, &c.

Figure 2:
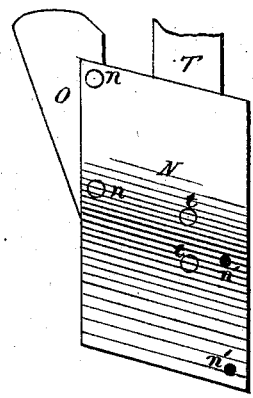

Fig. 2 is view of the reversible shovel N, mold-board O, shovel-brace T, bolts $t$ $t$, bolts $n$ $n$, bolt-holes $n'$ $n'$.

My invention consists as follows: I mortise the brace T to the tenoned end of the beam A in the usual manner. To form the reversible share or shovel I take a rhomboidal piece of metal, N—the segment of a cylinder—whose cross-section is a circle, and having its rectilinear elements parallel to the short sides or upper and lower ends of the rhomboidal segment. This is sharpened on its upper and lower edges. On the middle line, parallel to the two sides of the shovel, are bolt-holes $t$ $t$, through which bolts can pass and the attachment to the brace T be effected. N N are small holes, situated near the edge, through which bolts pass to secure the mold-board O.

When the edge of the shovel becomes dull from use it is taken from the arm T by loosening the bolts $t$ $t$. The mold-board O is changed to the diagonally-opposite side, and secured by bolts passing through the holes $n'$ $n'$. The shovel is now inverted, and the edge which was uppermost now comes to the ground, and the plow is in as good condition as when new. P is the arm, to which a subsoil-plow may be attached, and, like the arm R, may be made of wood or iron, the latter being preferred. These arms are provided with bolt-holes $p$ $p$, $r''$ $r''$, &c., by which the subsoil-plow may be raised or lowered, and may be given any desired pitch. The rod P is bolted to the plow-beam at S, and is riveted to the arm R at $r$. The rod R serves to give the required pitch to the plow, and to effectually brace the parts A, T, and P, and is fastened to A and T by the bolts $r'$.

These two plows may be used together; or the subsoil-plow may be entirely removed, and leave only a turning-plow.

Having thus fully described my invention, what I claim as new, and desire to secure by Letters Patent, is—

The plow herein described, provided with reversible rhomboidal shovel N, with mold-board O, gageable arm R with bolts $r'$ $r'$, subsoil gageable foot P with bolt S and pivot $r$, all constructed, arranged, and operating substantially as herein set forth and shown.

FRANCIS REESE.

Witnesses:
J. W. GWIN,
J. M. HENDRICK.